United States Patent
Charpin-Nicolle et al.

(10) Patent No.: US 11,444,040 B2
(45) Date of Patent: Sep. 13, 2022

(54) METHOD FOR MANUFACTURING A MICROELECTRONIC DEVICE INTEGRATING A PHYSICAL UNCLONABLE FUNCTION PROVIDED BY RESISTIVE MEMORIES, AND SAID DEVICE

(71) Applicant: COMMISSARIAT À L'ÉNERGIE ATOMIQUE ET AUX ÉNERGIES ALTERNATIVES, Paris (FR)

(72) Inventors: Christelle Charpin-Nicolle, Grenoble (FR); Florian Pebay-Peyroula, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 220 days.

(21) Appl. No.: 17/027,193

(22) Filed: Sep. 21, 2020

(65) Prior Publication Data

US 2021/0091014 A1   Mar. 25, 2021

(30) Foreign Application Priority Data

Sep. 23, 2019   (FR) ...................... 1910482

(51) Int. Cl.
  *H01L 23/00*     (2006.01)
  *H01L 45/00*     (2006.01)
(52) U.S. Cl.
  CPC ............ *H01L 23/573* (2013.01); *H01L 45/08* (2013.01); *H01L 45/1233* (2013.01); *H01L 45/16* (2013.01)

(58) Field of Classification Search
  CPC ... H01L 23/573; H01L 45/08; H01L 45/1233; H04L 9/3278
  See application file for complete search history.

(56) References Cited

U.S. PATENT DOCUMENTS

| | | |
|---|---|---|
| 2013/0023105 A1 | 1/2013 | Pramanik |
| 2016/0148664 A1 | 5/2016 | Katoh et al. |
| 2017/0048072 A1 | 2/2017 | Cambou |
| 2018/0358310 A1 | 12/2018 | May et al. |
| 2020/0279816 A1 | 9/2020 | Charpin-Nicolle et al. |

FOREIGN PATENT DOCUMENTS

| | | |
|---|---|---|
| WO | 2018175973 A1 | 9/2018 |
| WO | 2019027702 A1 | 2/2019 |

OTHER PUBLICATIONS

Bafrani,H A et al. "A facile approach for reducing the working voltage of Au/TiO2/Au nanostructured memristors by enhancing the local electric field" Nanotechnology—Dec. 4, 2017, vol. 29, 015205, pp. 1-8.

(Continued)

*Primary Examiner* — Marvin Payen
(74) *Attorney, Agent, or Firm* — Pearne & Gordon LLP

(57) ABSTRACT

A microelectronic device and method for manufacturing a microelectronic device comprising a plurality of resistive memories, a part of these resistive memories, called PUF memories, forming a PUF, the rest of these resistive memories being known as storage memories. The manufacturing process comprising forming a dielectric layer having on at least one contact surface in contact with an electrode a surface roughness of said surface greater than that of the same dielectric layer of the storage memories.

15 Claims, 4 Drawing Sheets

(56) References Cited

OTHER PUBLICATIONS

Charpin-Nicolle C et al. "Impact of roughness of TiN bottom electrode on the forming voltage of Hf02 based resistive memories" Microelectronic Engineering, Nov. 27, 2019, vol. 221, 111194, (pp. 1-4.
Tseng P. et al. "Error free physically unclonable function with programmed resistive random access memory using reliable resistance states by specific identification-generation method" Japanese Journal of Applied Physics, Mar. 2, 2018, vol. 57 , 04FE04-1-04FE04-6.

METHOD FOR MANUFACTURING A MICROELECTRONIC DEVICE INTEGRATING A PHYSICAL UNCLONABLE FUNCTION PROVIDED BY RESISTIVE MEMORIES, AND SAID DEVICE

TECHNICAL FIELD

The invention relates to the field of integrating unclonable physical functions into microelectronic devices.

One object of the invention is thus a method for manufacturing a microelectronic device incorporating a physical unclonable function and such a device.

STATE OF PRIOR ART

In order to combat counterfeiting of microelectronic devices, it is known to integrate unclonable physical functions into these microelectronic devices. Such unclonable physical functions, also known as the acronym PUF, are generally provided, within the scope of such microelectronic devices, in the form of a sub-part of the device called a PUF sub-part, which is conformed, in a unique and unclonable manner, to provide a given response to a given challenge. Such a unique and unclonable conformation can be obtained by using the variability of some manufacturing processes implemented in microelectronics.

Thus, for example, it is known from works of Po-Hao Tseng et al. published on 2 Mar. 2018 in the scientific journal "Japanese Journal of Applied Physics", Volume 57 referenced 04FE04, to use variability in the forming voltage of resistive memories to define such a PUF.

Indeed, resistive memories, such as the oxide-based resistive memories known under the acronym OxRam, have first to be subjected to a forming voltage, for generating a conductive filament and thus providing their memory function, by switching it to a conductive state.

Po-Hao Tseng et al. thus teach, in particular by FIG. 5 of their paper, to equip a microelectronic device with a plurality of resistive memory cells and to successively apply an increasing "forming voltage" to these resistive memory cells, so as to achieve formation of half of the resistive memories. Once this forming step has been carried out, the distribution in the formed memories and unformed memories is random and unique, since it is related to the variability of the resistive memory forming method. A simple query of the formed or unformed state of one or more resistive memories constitutes a query within the meaning of a PUF.

Nevertheless, if the integration of PUF as provided by PO-Hao Tseng et al. makes it possible to easily arrange a PUF on a microelectronic device, it is relatively long to implement and relatively complex to automate.

For example, there is currently no method for integrating a PUF based on resistive memories into microelectronic devices which can be easily automated and fully compatible with mass production.

DISCLOSURE OF THE INVENTION

The invention aims at solving the above-mentioned drawback.

To that end, the invention relates to a method for manufacturing a microelectronic device comprising a plurality of resistive memories, a first part of these resistive memories being configured to form an unclonable physical function, better known as the acronym PUF, the resistive memories of said first part of resistive memories being called PUF memories, a second part of resistive memories being to provide a memory function to the microelectronic device, the resistive memories of the second part being called a storage memory, the manufacturing method comprising the following steps of:
provinding a support comprising a plurality of first metal electrodes,
for each first electrode, forming a respective dielectric layer portion comprising a first contact surface facing the corresponding first electrode and a second surface opposite to the first contact surface, the dielectric layer portions for forming the PUF memories having, on at least one of the first contact surface and the second surface, a surface roughness greater than that of the same surface of the dielectric layer portions for forming the storage memories,
for each dielectric layer portion, forming a second electrode in contact with the second surface, said second surface then being a second contact surface facing the second electrode and the dielectric layer portion being interposed between the first and second electrodes, the resistive memories thus being formed.

With such a method for forming a microelectronic device, PUF memories have, due to their greater surface roughness of their dielectric layer portion, a greater roughness dispersion between two PUF memory dielectric layer portions than between two storage memory dielectric layer portions or according to prior art. Thus, due to this roughness dispersion of the different dielectric layer portions of PUF memories, this results in a greater dispersion of the "forming voltages". Hence, the PUF function can be generated simply by applying an average "forming voltage", with the increased dispersion in the "forming voltages" enabling the formation of approximately half of the PUF memories to be achieved.

With such a method, it is therefore not necessary, as is the case with the method taught by PO-Hao Tseng et al., to involve a long step of searching for the "forming voltage" that will enable half of the memories to be formed, since the "forming voltage" is determined by the surface roughness of the dielectric layer portions.

Hence, since the formation of approximately half of the PUF memories is easy to achieve and does not require a long testing period, the manufacturing method can be easily automated and is fully compatible with mass production.

It will be noted that in a practical embodiment of the invention, the surface roughness of the dielectric layer portions can be measured by an average roughness deviation Ra value or a maximum profile height Rmax value determined by means of 1 μm by 1 μm images of measured by atomic force microscopy also known under the acronym AFM.

It will be also noted that, alternatively, the invention can also be defined as a method for manufacturing a microelectronic device comprising a plurality of resistive memories, a first part of these resistive memories being configured to form an unclonable physical function, better known as the acronym PUF, the resistive memories of said first resistive memory part being called PUF memories, a second resistive memory part being to provide a memory function to the microelectronic device, the resistive memories of the second part being called storage memories, the manufacturing method comprising the following steps of:
providing a support comprising a plurality of first metal electrodes,
for each first electrode, forming a respective dielectric layer portion comprising a first contact surface in contact with the corresponding first electrode and a second surface opposite to the first contact surface, the dielectric layer portions for forming the PUF memories having on at least one of the first contact surface and the second surface a surface roughness dispersion greater than that of the same surface of the dielectric layer portions for forming the storage memories, for each dielectric layer portion, forming a second electrode in contact with the second surface, said second surface then being a second contact surface through which the dielectric layer portion is in contact with the second electrode and the dielectric layer portion being interposed between the first and second electrodes, whereby the resistive memories are formed.

Such a roughness dispersion can generally be a dispersion of a mean roughness deviation Ra value of the dielectric layer portions or a maximum profile height Rmax value of the dielectric layer portions, such as a standard deviation of the mean roughness deviation Ra value or the maximum profile height Rmax value for the dielectric layer portions. These values can be determined from 1 µm by 1 µm images of atomic force microscopy.

The step of forming the dielectric layer portion may include the following sub-steps of:

structuring a surface of the first electrodes corresponding to the PUF memories in such a way that said first electrodes have a higher surface roughness than the first electrodes corresponding to the storage memories, depositing each dielectric layer portion in contact with the first surface of the corresponding first electrode in such a way that the roughness of the first surface of the first electrode is at least partially transferred to the first contact surface of the corresponding dielectric layer portion, this transferred roughness being, for the dielectric layer portions for forming PUF memories, greater than that of the dielectric layer portions for forming storage memories.

With such a structuring of the surface of the first electrodes, it is easy to apply a large dispersion in the roughness values without affecting the quality of the insulator layer, since the latter is deposited with a conformal deposition. This makes it easy to obtain a large dispersion in the "forming voltage" without affecting the reliability of the PUF memories.

The structuring sub-step can be provided by etching the first electrodes for forming the PUF memories, said first electrodes preferably being etched by means of a plasma or reactive ion etching technique. With such an etching based on chemistry, it is easy to obtain a proper dispersion in the roughness values and thus in the "forming voltage".

During the substep of depositing each dielectric layer portion, depositing the insulating material forming said dielectric layer portions can be achieved by atomic layer deposition.

Such an atomic thin-film deposition is also known under the acronym ALD.

In the substep of depositing each dielectric layer portion, depositing the insulating material forming said dielectric layer portions can be performed by physical vapour deposition.

Such depositing steps allow a good roughness transfer between the deposited layer and the support layer on which deposition takes place.

In the step of forming the dielectric layer portion, there are provided:

prior to the sub-step of structuring a surface of the first electrodes, a sub-step of protecting the first electrodes for forming the storage memories is provided in order to protect said first electrodes during the sub-step of structuring the surface of the first electrodes, and between the sub-steps of structuring and depositing each dielectric layer portion, there is a sub-step of removing the protection of the first electrodes for forming the storage memories.

In this way, the surface structuring carried out on the first electrodes of the PUF memories has no incidence on the first electrodes of the storage memories.

Resistive memories can be oxide based resistive memories, and during the step of forming the dielectric layer portion for each first electrode, each dielectric layer portion for forming a PUF memory, the at least one surface of the first contact surface and the second surface has a mean roughness deviation Ra value of between 1 and 3 nm, 1 and 3 nm included, or between 2 and 3 nm, 2 and nm included.

With such roughness, PUF memories have a maximum "forming voltage" dispersion.

Resistive memories can be conductive bridging resistive memories.

Such a type of conductive bridging resistive memory is also known as the acronym CBRam for Conductive Bridging Random Access Memory.

There can further be provided the following steps of:

applying a forming voltage between the first and second electrodes of each of the PUF memories, this voltage being adapted to allow the formation of substantially one half of the PUF memories, applying a forming voltage higher than a minimum forming voltage of storage memories between the first and second electrode of each of the storage memories.

The step of forming a dielectric layer portion may include a substep of forming for each of the dielectric layer portions for forming PUF memories an additional dielectric layer portion such that the additional dielectric layer portion is disposed between the first contact surface and the first electrode.

In this way, the "forming voltage" of the PUF memories can be increased and with such an increase in the average "forming voltage" of the PUF memories it is contemplatable to match it with the "forming voltage" used for the storage memories.

The invention further relates to a microelectronic device comprising a plurality of resistive memories, a first part of these resistive memories being configured to form an unclonable physical function, better known as the acronym PUF, the resistive memories of said first part of resistive memories being said PUF memories, a second part of resistive memories being to provide a memory function to the microelectronic device, said device comprising a support, the resistive memories of the second part being called storage memories, each resistive memory comprising:

a first and a second metal electrode, the first electrode being arranged in a support, a dielectric layer portion interposed between the first and second electrodes and having a first contact surface in contact with the first electrode and a second contact surface in contact with the second electrode.

The dielectric layer portions of PUF memories have on at least one of the first contact surface and the second contact surface a surface roughness of said surface greater than that of the same surface of the dielectric layer portions of the storage memories.

Such a device has the advantages associated with the manufacturing method according to the invention which enabled it to be manufactured.

Alternatively, it is also possible to define the device according to the invention as a microelectronic device comprising a plurality of resistive memories, a first part of these resistive memories being configured to form an unclonable physical function, better known as the acronym PUF, the resistive memories of said first part of resistive memories being said PUF memories, a second part of resistive memories being to provide a memory function to the microelectronic device, the resistive memories of the second part being called a storage memory, each resistive memory comprising:

a first and a second metal electrode, the first electrode being arranged in a support, a dielectric layer portion interposed between the first and second electrodes and having a first contact surface in contact with the first electrode and a second contact surface in contact with the second electrode.

The dielectric layer portions of the PUF memories have on at least one of the first contact surface and the second contact surface a surface roughness dispersion of said surface greater than that of the same surface of the dielectric layer portions of the storage memories.

Resistive memories can be oxide based resistive memories, the dielectric layer portions of the PUF memories having on at least one of the first and second contact surfaces a mean roughness deviation Ra value of between 1 and 3 nm, 2 and 3 nm included, this mean roughness deviation Ra preferably being between 1 and 3 nm.

Resistive memories can be conductive bridging resistive memories.

The PUF memories may each have an additional dielectric layer portion between the first contact surface opposite to the first electrode.

In this way, it is contemplatable to provide PUF memories with an average "forming voltage" comparable to the "forming voltage" used for storage memories.

BRIEF DESCRIPTION OF THE DRAWINGS

The present invention will be better understood upon reading the description of exemplary embodiments, given purely by way of indication and in no way limiting, with reference to the appended drawings in which.

Identical, similar or equivalent parts of the different figures bear the same numerical references so as to facilitate switching from one figure to the other.

The different parts represented in the figures are not necessarily represented on a uniform scale, to make the figures more legible.

The various possibilities (alternatives and embodiments) should be understood as being not mutually exclusive and combinable with each other.

DETAILED DESCRIPTION

Figure 1:
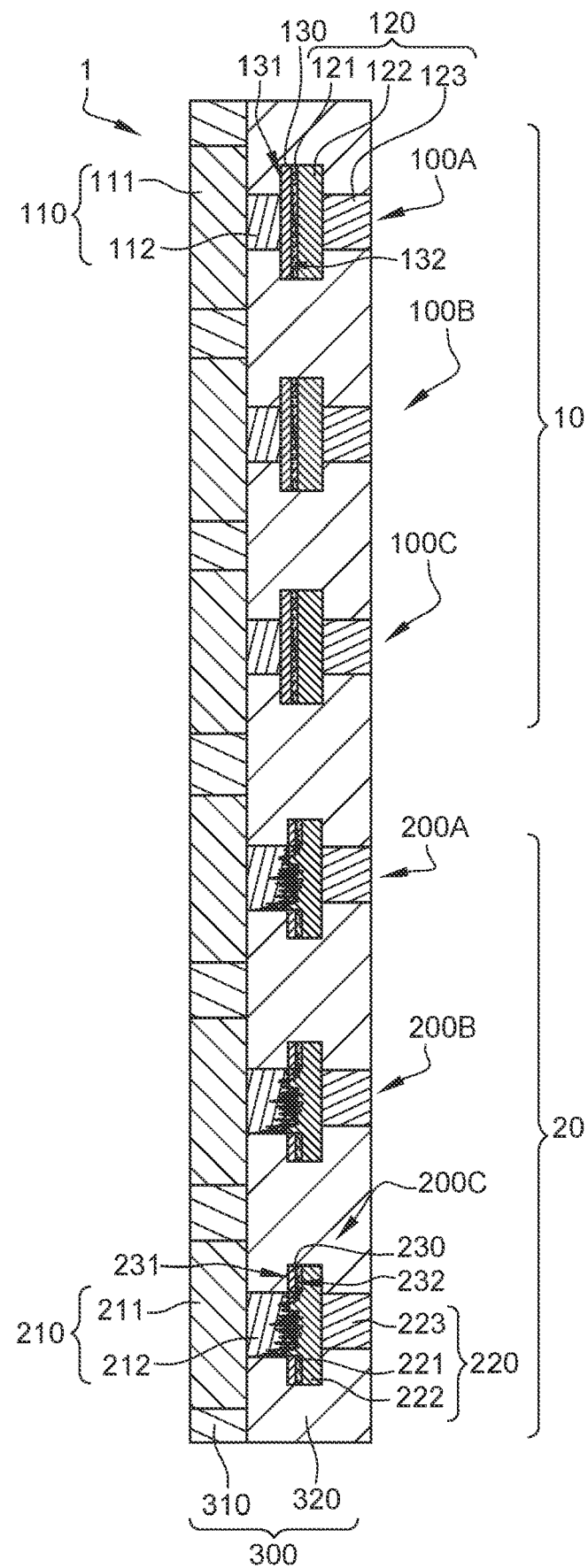
FIG. 1 illustrates a device according to the invention comprising both resistive memories forming a PUF, called PUF memories, and conventional resistive memories, FIG. 2 graphically illustrates the variation of the "forming voltage" of a resistive memory as a function of the average roughness deviation Ra value of the oxide layer of said resistive memory, FIG. 3 graphically illustrates the variation of the "forming voltage" of a resistive memory as a function of the maximum profile height Rmax value of the oxide layer of said resistive memory.

FIG. 1 illustrates a microelectronic device 1 comprising a plurality of resistive memories 100, 100A, 100B, 100C, 200, 200A, 200B, 200C of which a first part 10 is resistive memories 100A, 100B, 100B according to prior art, called storage memories, and a second part 20 is configured to form an unclonable physical function, said resistive memories 200, 200A, 200B, 200C of said second part being called PUF memories.

It will be noted that if in this embodiment, resistive memories are oxide-based resistive memories, better known under the name OxRAM, given similarities between the different types of resistive memories, the skilled person is able to apply the invention to other types of resistive memories by means of simple routine tests.

It will be noted that, according to a usual possibility of resistive memories, the resistive memories 100, 100A, 100B, 100C, 200, 200A, 200B, 200C of a microelectronic device 1 can be integrated into a metallisation level of said microelectronic device. It is this possibility which is described in this first embodiment. Therefore, in order to simplify the present description of the invention, only this first metallisation level is shown in the figures and described. Other parts of such a device are indeed conventional for the person skilled in the art and are not the subject matter of the present disclosure.

As shown in FIG. 1, a resistive memory 100A, 1006, 100C, 200A, 200B, 200C, according to the invention, irrespective of whether it is a storage memory or a PUF memory comprises:

a first metal electrode 110, 210 and a second metal electrode 120, 220, an oxide layer portion 130, 230 interposed between the first and second electrodes 110, 120, 210, 220 and having a first contact surface 131, 231 in contact with the first electrode 110, 210 and a second contact surface 132, 232 in contact with the second electrode 120, 220.

According to the principle of the invention, the oxide layer portions 230 of the PUF memories have a surface roughness of at least one of the first and second contact surfaces 231, 232 that is greater than that of the same surface of the oxide layer portions 130 of the storage memories. In the present embodiment, this increased surface roughness with respect to the storage memories is present, as shown in FIG. 1, on each of the first and second contact surfaces 231, 232 of the oxide layer portions of the PUF memories 200, 200A, 200B, 200C, with the surface roughness of the first contact surface 231 being transferred to the second contact surface 132, 232. Such an increased roughness, and thus the resulting roughness dispersion, makes it possible to achieve a "forming voltage", for PUF memories, with a greater dispersion than that of conventional resistive memories such as the storage memories 100, 100A, 1006, 100C.

Thus, the oxide layers 130 of the storage memories 100, 100A, 1006, 100C have a so-called "low" and weakly dispersed roughness, so as to exhibit a low "forming voltage" dispersion in relation to that of the PUF memories 200, 200A, 200B, 200C.

More precisely, in the first embodiment, the support 300 is a conventional microelectronic support, such as a substrate of silicon or another semiconductor material, into which active components, such as MOSFETs or optoelectronic components, and possibly passive components are integrated, which are connected to each other by means of metallisation levels, of which only two levels are illustrated in FIG. 1, the rest of the support not being illustrated. These two metallisation levels each comprise at least one dielectric material in which metal vias are housed.

More precisely, in the present embodiment and as illustrated in FIG. 1, the first and second levels illustrated in FIG. 1 comprise a first dielectric layer 310 of silicon dioxide SiO2 and a second dielectric layer 320 of silicon nitride SixNy, respectively.

The first electrode 110, 210 of each of the resistive memories 100, 100A, 1006, 100C, 200, 200A, 200B, 200C is thus partly housed in the first dielectric layer 310 and partly housed in the second dielectric layer 320, while the oxide layer portion 130, 230 and the second electrode 120, 220 of each resistive memory 100, 100A, 1006, 100C, 200, 200A, 200B, 200C are entirely housed in the second dielectric layer 320. Of course, this configuration with two dielectric layers is provided only by way of example and other configurations are contemplatable without departing from the scope of the invention. It will be noted in particular that it is thus quite contemplatable that the second dielectric layer may be replaced with several dielectric layers made of one or more respective dielectric materials.

Each first electrode 110, 210, comprises a first metallisation layer 111, 211 forming, for example, a metal line of a connection circuit of the microelectronic device 1, housed in the first dielectric layer 310, and a first metal via 112, 212 in contact with the first metallisation layer and housed in the second dielectric layer 320.

Each metallisation layer 111, 211 can be made of a metal material suitable for forming a connection circuit track, wherein this metal material can be selected from the group consisting of titanium nitride TiN, aluminium Al, copper Cu, tungsten W and alloys thereof. The first metallisation layer 111, 211 can have conventional dimensions of a metallisation layer of prior art and thus have a thickness between 100 nm and 1 μm.

Each first metal via 112, 212 can be made of a metal material suitable for forming a resistive memory. In this first mode for which resistive memories are oxide-based, each of the first metal vias 112, 222 can, for example, be made of a titanium nitride TiN. The first metal via 122, 212 can have a thickness of between 20 nm and 1 μm or even between 50 and 500 nm. Each first metal via 112, 212 has a first surface opposite to the corresponding metallisation layer 111, 211, said first surface forming a surface of the first electrode. Each first metal via 112, 212, and thus the corresponding first electrode 110, 210, is in contact with the first contact surface 131, 231 of the corresponding oxide layer portion 130, 230 through its first surface.

In this first embodiment, for manufacturing reasons, the first surface of the first metal vias 122, 222 corresponding to the storage memories and PUF memories has a surface roughness substantially identical to that of the first contact layer 131, 231 of the corresponding oxide layer portion 130.

Each oxide layer portion 130, 230 is a dielectric layer portion adapted to provide a resistive memory function. Thus, in this first embodiment in which the resistive memories 100, 100A, 1006, 100C, 200, 200A, 200B, 200C are oxide-based resistive memories, the oxide layer can be implemented in a so-called High-K dielectric, i.e. a dielectric with a dielectric constant higher than that of silicon dioxide SiO2, such as Hafnium dioxide $HfO_2$. According to this possibility in which the dielectric layer is of Hafnium dioxide $HfO_2$, in this first embodiment, each portion of the 130, 230 oxide layer can have a thickness of between 5 and 10 nm. Of course, the thickness of the oxide layer 130, 230 is adapted according to the dielectric material it consists of.

According to the principle of the invention, in this first embodiment, each oxide layer portion 130, 230 forms a dielectric layer portion according to the invention. The second contact face 132, 232 of each oxide layer portion 130, 230 is in contact with the corresponding second electrode 120, 220. The second electrode 120, 220 comprises:
- an electrode layer 121, 221, in contact with the corresponding oxide layer portion 130, 230 on the second contact surface 131, 231 thereof,
- a metal contact layer 122, 222, in contact with the corresponding electrode layer 121, 221 opposite to the corresponding oxide layer portion 130, 230,
- a second vertical via 123, 223, in contact with the corresponding metal contact layer 122, 222, opposite the metal contact layer 122, 222, the second vertical via being in contact on an opposite surface, with a metal layer of a metallisation level not shown.

Each electrode layer 121, 221, within the scope of this embodiment in which the resistive memories are oxide-based, can be made of Titanium Ti and can have a thickness of between 5 and 10 nm. Each electrode layer 121, 221 has a surface roughness which is substantially identical to that of the corresponding insulation layer 130.

The metal contact layer 122, 222 is made of a conductive material such as titanium nitride TiN and can have a thickness between 10 and 500 nm.

The second vertical via 123, 223 can be made of a conductive material suitable for forming a vertical via, such as titanium nitride TiN, tungsten W or copper Cu.

Figure 3:
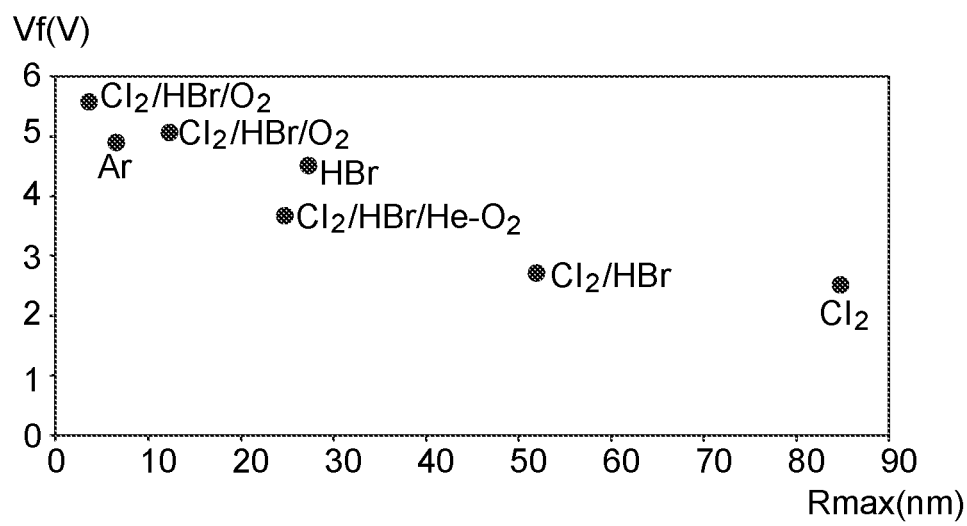
Figure 4:
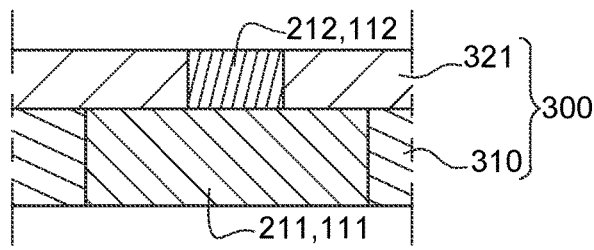
FIG. 4 illustrates an intermediate structure for the formation of a resistive memory in accordance with the invention, irrespective of whether it is a PUF memory or a conventional resistive memory.

More precisely, with regard to the adapted roughness of at least one of the first and second contact surfaces 131, 132, 231, 232, FIGS. 3 and 4 illustrate the variation of the "forming voltage" as a function of the value of the average roughness deviation Ra and the value of the maximum profile height Rmax, respectively, of the first and second contact surfaces 131, 132, 231, 232 of an oxide resistive memory in accordance with the invention.

It is to be noted that, for the purposes of this document, the mean roughness deviation Ra values and the maximum profile height Rmax values are determined in accordance with ISO4287 standard, using AFM 1 μm by 1 μm images.

It will be noted that for determining these values, each resistive memory 100, 100A, 1006, 100C, 200, 200A, 200B, 200C in accordance with this embodiment, with the oxide layer portion 130 and the electrode layer 131 each having a thickness of 10 nm. Thus, it can be seen in FIG. 2 that the "forming voltage" Vf varies with the of mean roughness deviation Ra values when the latter are between 0.1 nm and 4 nm, switching from 6 V to 3 V, and then stabilises at 2.5 V for mean roughness deviation Ra values greater than 4 nm.

The same phenomenon is also observable in FIG. 3, representing the variation in the "forming voltage" as a function of the maximum profile height Rmax value measured; the "forming voltage" Vf decreasing when the maximum profile height Rmax value shifts from 5 nm to 40 nm. The "forming voltage" then stabilises for maximum profile height Rmax values greater than 40 nm.

It will be noted that, of course, where, in accordance with the invention, a layer, such as an oxide layer portion 130, 230, has an increased surface roughness, the surface roughness dispersion is also increased.

Figure 2:
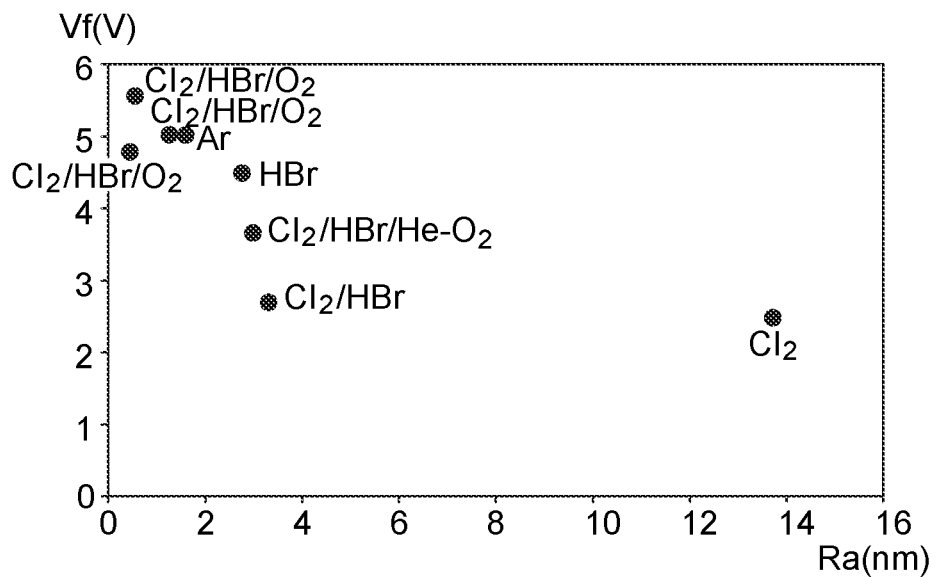

However, as shown in FIG. 2, the "forming tension" abruptly decreases when the mean roughness deviation Ra value changes varies between 1 nm and 3 nm and more particularly between 2 and 3 nm.

As roughness dispersions are higher as the mean roughness deviation Ra value increases, a large dispersion in the forming voltage values will be obtained for mean roughness values targeted in the range 1 nm to 3 nm, this value preferably being in the range from 2 nm to 3 nm.

Equivalently, it is possible to achieve a maximum "forming voltage" dispersion for maximum profile height Rmax values between 5 and 50 nm and preferably between 15 and 50 nm.

Thus, according to the principle of the invention and by way of example, for a mean roughness deviation Ra value targeted in the order of 2.5 nm, the mean roughness deviation Ra value of the vertical vias 212, and therefore of the oxide layer portions 230, can be between 1.5 nm and 3.5 nm. This roughness dispersion is the cause of a large "forming voltage" dispersion and a lowered "average" "forming voltage" value, the latter being divided by two. Thus, in this particular case, there will be a "forming voltage" variation of the PUF memories by more than 30% around the average value of the "forming voltage".

Figure 5A:
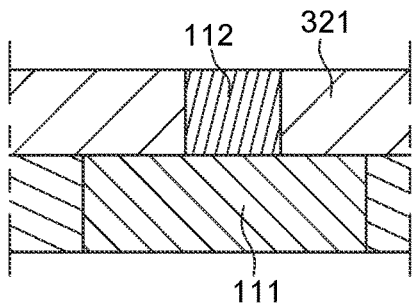
FIG. 5A illustrates an intermediate structure for the formation of a conventional resistive memory in accordance with the invention.
Figure 5B:
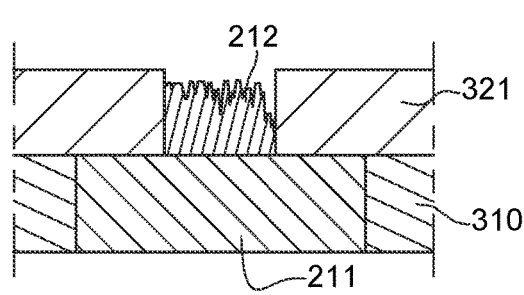
FIG. 5B illustrates an intermediate structure for the formation of a PUF memory in accordance with the invention.
Figure 6A:
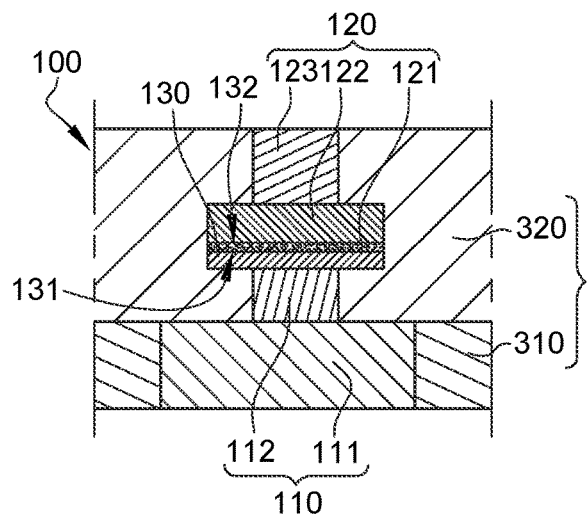
FIG. 6A illustrates a conventional resistive memory obtained from the intermediate structures shown in FIG. 5A.
Figure 6B:
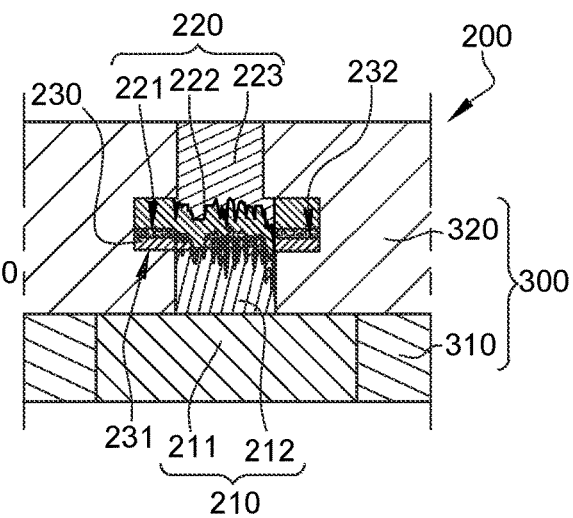
FIG. 6B shows a PUF memory obtained from the intermediate structures shown in FIG. 5B, FIG. 7 graphically illustrates the variation of the mean roughness deviation Ra value of a Hafnium oxide layer as a function of the composition of gases used during plasma etching and etching time.

In order to achieve such a surface roughness variation according to the principle of the invention, it is possible to implement a method for manufacturing a microelectronic device 1 comprising the following steps of:

providing a support 300 comprising first electrodes 110, 210 for forming resistive memories 100, 100A, 100B, 100C and PUF memories 200, 200A, 200B, 200C, said first electrodes being arranged in a first dielectric layer 310 of said support 300, each first electrode 110, 210 comprising a metallisation layer 111, 211 and a first vertical via 112, 212, the first vertical via 112, 212 having a first surface opposite to the metallisation layer 111, 211, said first surface forming a surface of the first electrode 110, 210, as illustrated in FIG. 4, depositing a protective layer, not represented, such as an exposed photosensitive resin, covering the first vertical via 112, for forming storage memories, structuring the first surface of the first vertical vias for forming a PUF memory 200, 200A, 200B, 200C, said structuring being carried out by physical etching, such as plasma etching or reactive ion etching, the protective layer protecting the first vertical vias for forming the storage memories, removing the protective layer, e.g. by a stripping step, (removal of the resin layer), so that the first vertical via 112 for the formation of storage memories 100, 100A, 100B, 100C have a first surface having a preserved roughness, as illustrated in FIG. 5A, and that the first vertical vias for forming PUF memories have a higher roughness, and therefore a dispersion in the roughness values increased which are to be transmitted to the oxide layer 130, as illustrated in FIG. 5B, depositing an oxide layer whose parts in contact with the first surface of the metal vias 112, 212 form the corresponding oxide layer portions 130, 230, this oxide layer deposition being preferentially an atomic layer deposition, each of the oxide layer portions being in contact with the corresponding first vertical via by a first contact surface 131, 231.

depositing a metal layer, such as a layer of titanium Ti, whose parts in contact with the oxide layer portions 130, 230 form the corresponding electrode layers 121, 221, said parts of the metal layer forming the electrode layers 121, 221 being deposited in contact with the second contact surface 132, 232 of the corresponding oxide layer portions 130, 230, depositing a conductive layer, such as a layer of titanium nitride TiN, the parts of said conductive layer in contact with the electrode layers 121, 221 each forming the corresponding metal contact layers 122, 222 opposite to the corresponding oxide layer portion 130, 230, locally etching, e.g. by using successive steps of depositing a photosensitive resin, lithography of said resin, chemically etching and removing the photosensitive resin, in order to individualise the oxide layer portions 130, electrode layers 121, 221 and metal contact layers 122, 222 and thus define patterns of the storage memory cells and PUF memory cells, depositing the rest of the second dielectric layer 320, such as silicon nitride, so as to electrically insulate the patterns of the cells of storage memory and PUF memory, planarising the second dielectric layer 320, locally etching the second dielectric layer 320, for example by using successive steps of depositing a photosensitive resin, lithography of said resin, chemically etching and stripping the photosensitive resin, so as to release from the second dielectric layer, locations for forming the second vertical vias 123, 223, depositing in contact with each of the metal contact layers 122, 222 released from the second dielectric layer 320 when locally etching, a conductive material, such as titanium nitride, to form the vertical vias 123, 223, planarising the second dielectric layer and the conductive material excessively deposited to form the second electrodes 120, 130 as illustrated in 6A and 6B.

During the step of structuring the first surface of the first vertical vias for the formation of a PUF memory 200, 200A, 200B, 200C, this step, in accordance with the method according to the present embodiment, can be carried out using plasma etching or reactive ion etching. Within the framework of such an etching, the inventors have studied different types of plasma etching allowing the surface of the first vertical vias to be modeled, the results of this study are shown in the table below.

| Plasma | Ra | ΔRa | Rmax | ΔRmax |
| --- | --- | --- | --- | --- |
| TiN surface | 0.1-0.2 nm | 0.1 nm | 0.9-1.1 nm | 0.2 nm |
| $Cl_2$ Plasma | 5.8-7 nm | 1.2 nm | 46.9-55.1 nm | 8.2 nm |
| HBr plasma | 1.7-1.8 nm | 0.1 nm | 12.2-17.4 nm | 4.2 nm |
| $Cl_2$/HBr Plasma | 0.6-0.7 nm | 0.2 nm | 5.8-10 nm | 4.2 nm |
| $Cl_2$/HBr/$O_2$ Plasma | 0.4-0.6 nm | 0.2 nm | 3.2-4.2 nm | 1 nm |
| Ar Plasma | 0.4-1 nm | 0.6 nm | 4.4-8.7 nm | 4-5 nm |

For this study, for each of the different gases contemplated, i.e. chlorine $Cl_2$, hydrogen bromide HBr, a chlorine/ hydrogen bromide Cl$_2$/HBr mixture, a chlorine/hydrogen bromide/dioxygen Cl$_2$/HBr/O$_2$ mixture and argon Ar, the inventors previously carried out a 5-second reactive ion etching with chlorine/hydrogen bromide/dioxygen Cl$_2$/HBr/O$_2$ in order to remove native oxide from the surface and used a 15-s plasma etching. The values obtained are compared with the surface roughness values shown prior to etching in the first line under the reference "TiN surface".

It can thus be seen that each of these gases allows a significant increase in the dispersion of the mean roughness deviation ΔRa and the dispersion of the maximum profile height ΔRmax. It is therefore possible, with each of these gases and by adequately adjusting the etching time, to provide, according to the principle of the invention, a dispersion in the surface roughness of the first vertical vias 212, and therefore in the oxide layer 230 which is adapted.

Figure 7:
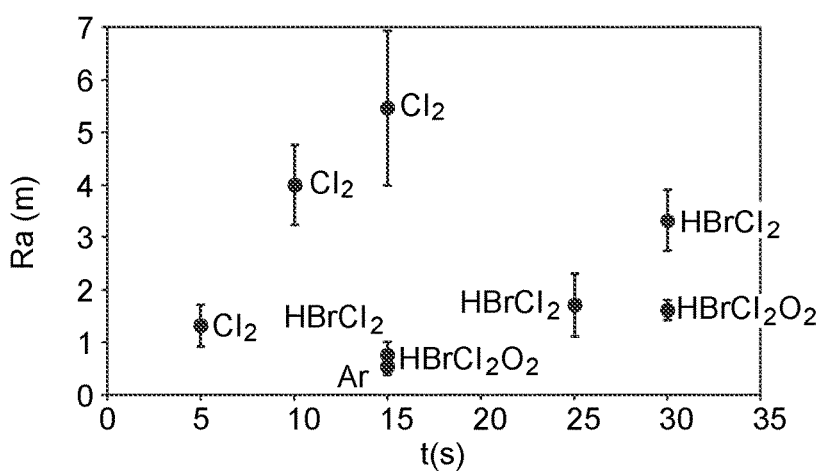

This is precisely what is shown in FIG. 7. Indeed, it graphically shows the standard deviation of the mean roughness deviation Ra of a titanium nitride surface as a function of etching time and etching chemicals used, in particular for plasmas of chlorine Cl$_2$, a mixture of chlorine/hydrogen bromide Cl$_2$/HBr, a mixture of chlorine/hydrogen bromide/dioxygen Cl$_2$/HBr/O$_2$ and argon Ar. It can thus be seen that with a chlorine based plasma, a time of 5 s makes it possible to obtain a relatively large standard deviation of the mean roughness deviation Ra whereas, for other etching chemicals (such as chlorine/hydrogen bromide/dioxygen Cl$_2$/HBr/O$_2$ mixture), times in the order of 30 s are required to obtain a standard deviation of the mean roughness deviation Ra with the same order of magnitude as that obtained with a chlorine Cl$_2$ based plasma.

Thus, according to the principle of the invention, the adaptation of the dispersions of the mean roughness deviation Ra of the first vertical vias 212 and thus of the oxide layer portion 230, can be made within the scope of this first embodiment, by adapting etching time and etching chemicals.

It will be noted that if in the present embodiment, the surface roughness dispersion of the oxide layer portions 230 of the PUF memories is provided for each of the first and second contact surfaces 231, 232, it is nevertheless contemplatable, without departing from the scope of the invention, that this dispersion is produced otherwise and on only one of the first and second contact surfaces 231, 232. Thus, for example, it could be contemplatable to directly model the surface of the dielectric layer portions 230 or to restore at least partially the surface state of the second contact surface 232 without departing from the scope of the invention.

Finally, and in order to "form" the memories, irrespective of whether they are PUF memories or storage memories, the method for manufacturing the microelectronic device may also include:
  applying a "forming voltage" between the first and second electrodes of each of the PUF memories, this voltage being adapted to allow formation of substantially one half of the PUF memories,
  applying a "forming voltage" higher than a minimum storage memory forming voltage between the first and second electrode of each storage memory.

It will be noted that, according to an alternative of the invention not illustrated, it is contemplatable that the first electrodes 110, 210 are formed in several steps with a final metal layer portion thereof, comprising the surface on which the corresponding dielectric layer portion is deposited, being formed separately for the first electrodes 110 for forming storage memories and for that for forming PUF memories. Thus, this final metal layer portion can be formed, for the first electrodes 110 for forming PUF memories, being "structured" with a greater surface roughness than the final metal layer portions.

Such a formation separately from these final layer portions can thus be achieved, for example, by using a different deposition method and/or by using different deposition conditions.

Figure 8:
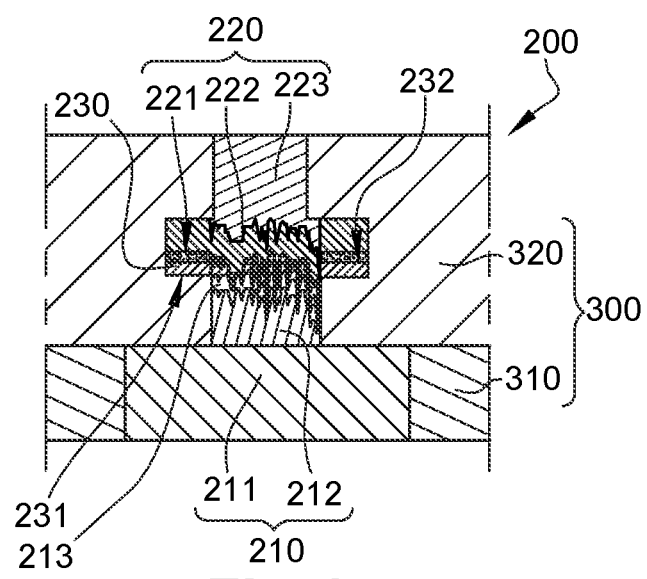
FIG. 8 illustrates a PUF memory according to an alternative of the invention in which the PUF memories comprise, between a first via and the oxide layer, a further oxide layer, so as to increase average forming voltage of the PUF memories.

According to another alternative of the invention, illustrated in FIG. 8, PUF memories may each additionally comprise an additional dielectric layer portion 213 disposed between the first contact surface 131 and the first electrode 210. Such an additional dielectric layer portion 213 makes it possible to increase the average "forming voltage" of the PUF memories in such a way that it is substantially identical to the forming voltage used for storage memories. Indeed, the increased surface roughness of the dielectric layer portion 130 of the PUF memories is both the cause of an increase in the "forming voltage" of the PUF memories and also the cause of a decrease in its average value. Thus, adding such a dielectric layer portion 213 makes it possible to increase the "forming voltage" of the PUF memories and thus allows the use of the same forming voltage for all the memories, including storage memories and PUF memories.

The additional dielectric layer portion 213 is preferably made of an oxide native to the material of the first electrode 210. Of course, the additional dielectric layer portion can be made of another dielectric material, such as that used for the dielectric layer portion, without departing from the scope of the invention.

The method for manufacturing a microelectronic device 1 according to this alternative of the invention differs from the method for manufacturing a microelectronic device according to this alternative of the invention in that the step of forming a dielectric layer portion 130 comprises a sub-step of forming for each of the dielectric layer portions 130 for forming PUF memories an additional dielectric layer portion 213 in such a way that this additional dielectric layer portion 213 is arranged between the first contact surface 131 and the first electrode 210. Such a sub-step of forming the additional dielectric layer portion 213 may consist, after the step of structuring the first electrode 210, of performing a surface oxidation of the surface of the first electrode 210.

It will be also noted that within the scope of this alternative, and in order to "form" memories, irrespective of whether they are PUF memories or storage memories, within the scope of the method for manufacturing the microelectronic device 1, the "forming voltage" may be identical for PUF memories and storage memories.

As an alternative to the present alternative not illustrated, it is also contemplatable that PUF memories comprise the additional dielectric layer portion between the second surface 132 and the second electrode 220. Thus, in a manner identical to the a dielectric layer portion of this alternative, PUF memories may have an increased "forming voltage" in order to allow the use of the same forming voltage for all memories, including storage memories and PUF memories.

Moreover, if in the present embodiments the dielectric layer portions are in contact by each of their first and second contact surfaces with the corresponding first and second electrodes, it is also contemplatable, without departing from the scope of the invention, that an intermediate layer is provided interfacing between the said contact surface and the corresponding electrode.

The invention claimed is:
1. A method for manufacturing a microelectronic device comprising a plurality of resistive memories, a first part of these resistive memories being configured to form an unclonable physical function, better known as the acronym PUF, the resistive memories of said first part of resistive memories being said PUF memories, a second part of resistive memories being to provide a memory function to the microelectronic device, the resistive memories of the second part being called storage memories, the manufacturing method comprising the following steps of:

providing a support comprising a plurality of first metal electrodes, for each first electrode, forming a dielectric layer portion comprising a first contact surface facing the corresponding first electrode and a second surface opposite to the first contact surface, the dielectric layer portions for forming the PUF memories having, on at least one of the first contact surface and the second surface, a surface roughness greater than that of the same surface of the dielectric layer portions for forming the storage memories, for each dielectric layer portion, forming a second electrode facing the second surface, said second surface then being a second contact surface facing the second electrode and the dielectric layer portion being interposed between the first and second electrodes, the resistive memories being thus formed.

2. The method for manufacturing a microelectronic device according to claim 1, wherein the step of forming the dielectric layer portion for each first electrode comprises the following sub-steps of:

structuring a surface of each first electrode corresponding to the PUF memories so that said first electrodes corresponding to the PUF memories have a surface roughness greater than the surface of the first electrodes corresponding to the storage memories, depositing each dielectric layer portion in contact with the first surface of the corresponding first electrode in such a way that the roughness of the surface of the first electrode is at least partially transferred to the first contact surface of the corresponding dielectric layer portion, this transferred roughness being, for dielectric layer portions for forming the PUF memories, greater than the transferred roughness for the dielectric layer portions for forming the storage memories.

3. The method for manufacturing a microelectronic device according to claim 2, wherein the substep of structuring the surface of each first electrode corresponding to a PUF memory is provided by etching the first electrodes for forming the PUF memories.

4. The method for manufacturing a microelectronic device according to claim 2, wherein the surface of the first electrodes is etched by means of a plasma etching or reactive ion etching technique.

5. The method for manufacturing a microelectronic device according to claim 2, wherein during the substep of depositing each dielectric layer portion, depositing a dielectric material forming the dielectric layer portions is carried out by atomic layer deposition.

6. The method for manufacturing a microelectronic device according to claim 2, wherein during the substep of depositing each dielectric layer portion, depositing a dielectric material forming the dielectric layer portions is carried out by physical vapour deposition.

7. The method for manufacturing a microelectronic device according to claim 2, wherein during the step of forming the dielectric layer portion for each first electrode:

prior to the sub-step of structuring a surface of the first electrodes, a sub-step of protecting the first electrodes for the formation of the storage memories in order to protect said first electrodes during the sub-step of structuring the surface of the first electrodes, and between the sub-steps of structuring and depositing each dielectric layer portion, there is a sub-step of removing the protection of the first electrodes for forming the storage memories.

8. The method for manufacturing a microelectronic device according to claim 1, wherein the resistive memories are oxide-based resistive memories, and wherein in the step of forming the dielectric layer portion for each first electrode, for each dielectric layer portion for forming a PUF memory, the at least one surface of the first contact surface and the second surface has a mean roughness deviation Ra value of between 1 and 3 nm, 1 and 3 nm included.

9. The manufacturing method according to claim 1, wherein the resistive memories are conductive bridging resistive memories.

10. The method for manufacturing a microelectronic device according to claim 1, wherein there are additionally provided the following steps of:

applying a forming voltage between the first and second electrodes of each of the PUF memories, this voltage being adapted to allow the formation of substantially one half of the PUF memories, applying a forming voltage higher than a minimum storage memory forming voltage between the first and second electrode of each of the storage memories.

11. The method for manufacturing a microelectronic device according to claim 1, wherein the step of forming a dielectric layer portion for each first electrode comprises a substep of forming, for each of the dielectric layer portions for forming a PUF memory, an additional dielectric layer portion in such a manner that this additional dielectric layer portion is disposed between the first contact surface and the first electrode.

12. A microelectronic device comprising a plurality of resistive memories, a first part of these resistive memories being configured to form an unclonable physical function, better known as the acronym PUF, the resistive memories of said first part of resistive memories being called PUF memories, a second part of resistive memories being to provide a memory function to the microelectronic device, the resistive memories of the second part being called storage memories, the device comprising a support, each resistive memory comprising:

a first metal electrode and a second metal electrode, the first electrode being arranged in a support, a dielectric layer portion interposed between the first and second electrodes and having a first contact surface facing the first electrode and a second contact surface facing the second electrode, wherein the dielectric layer portions of the PUF memories have, on at least one of the first contact surface and the second contact surface, a surface roughness of said surface greater than that of the same surface of the dielectric layer portions of the storage memories.

13. The microelectronic device according to claim 12, wherein the resistive memories are oxide-based resistive memories, and wherein the dielectric layer portions of the PUF memories have on at least one of the first and second contact surfaces a mean roughness deviation Ra value of between 1 and 3 nm, 2 and 3 nm included.

14. The microelectronic device according to claim 12, wherein the resistive memories are conductive bridging resistive memories.

15. The microelectronic device according to claim 12, wherein the PUF memories each further comprise an additional dielectric layer portion disposed between a first contact surface facing the first electrode.

* * * * *